(12) United States Patent
Huang et al.

(10) Patent No.: US 10,234,264 B2
(45) Date of Patent: Mar. 19, 2019

(54) OVERALL Z-DIRECTION DISPLACEMENT MEASURING SYSTEM

(71) Applicant: SHENZHEN ORBBEC CO., LTD., Shenzhen, Guangdong (CN)

(72) Inventors: Yuanhao Huang, Guangdong (CN); Honghuai Xu, Guangdong (CN); Chengyu Zhang, Guangdong (CN)

(73) Assignee: Shenzhen Orbbec Co., Ltd., Shenzhen (CN)

( * ) Notice: Subject to any disclaimer, the term of this patent is extended or adjusted under 35 U.S.C. 154(b) by 0 days.

(21) Appl. No.: 15/408,285

(22) Filed: Jan. 17, 2017

(65) Prior Publication Data
US 2017/0122721 A1    May 4, 2017

Related U.S. Application Data

(63) Continuation of application No. PCT/CN2015/079452, filed on May 21, 2015.

(30) Foreign Application Priority Data

Aug. 28, 2014  (CN) .......................... 2014 1 0430984

(51) Int. Cl.
*G01B 9/02*     (2006.01)
*G01H 9/00*     (2006.01)
*G01B 11/06*    (2006.01)

(52) U.S. Cl.
CPC ..... *G01B 9/02027* (2013.01); *G01B 9/02045* (2013.01); *G01B 9/02094* (2013.01);
(Continued)

(58) Field of Classification Search
CPC ............ G01B 9/02027; G01B 9/02045; G01B 11/06; G01B 9/02094; G01B 2290/65; G01B 2290/70
See application file for complete search history.

(56) References Cited

U.S. PATENT DOCUMENTS 5,827,971 A * 10/1998 Hale ........................ G01H 9/00
                                                    356/502
6,323,943 B1 * 11/2001 Maruyama .............. G01P 3/366
                                                    356/28.5
(Continued)

FOREIGN PATENT DOCUMENTS

CN          101023377 A       8/2007
CN          102878935 A       1/2013
(Continued)

OTHER PUBLICATIONS

International Search Report for Application No. PCT/CN2015/079452, dated Aug. 25, 2015, 5 pages.

*Primary Examiner* — Mohamed K Amara
(74) *Attorney, Agent, or Firm* — Sheppard Mullin Richter & Hampton LLP

(57) ABSTRACT

The present disclosure relates to a full-field Z-direction displacement measurement system. Dynamic measurement is achieved on the basis of laser shearing speckle interferometry by using a spatial domain phase shift method. The homogeneity and similar measurement accuracy of the laser shearing speckle interferometry and the Doppler interferometry are further used to help the laser shearing speckle interferometry to implement absolute displacement measurement by using the single-point time domain Doppler interferometry. By means of the improvements in these aspects, the measurement system of the present invention can achieve full-field Z-direction displacement measurement, high-precision full-field absolute value vibration measurement and transient depth measurement, and can have important applications in depth measurement, three-dimensional sensing, vibration measurement in aerospace and the depth measurement in new material characterization detection and other fields.

16 Claims, 1 Drawing Sheet

(52) U.S. Cl.
CPC .......... *G01B 9/02098* (2013.01); *G01B 11/06* (2013.01); *G01H 9/00* (2013.01); *G01B 2290/65* (2013.01); *G01B 2290/70* (2013.01)

(56) References Cited

U.S. PATENT DOCUMENTS

| | | | | |
|---|---|---|---|---|
| 6,486,959 | B2* | 11/2002 | Delaye | G01H 17/00 356/28.5 |
| 6,587,212 | B1* | 7/2003 | Barber | G01B 11/00 356/502 |
| 6,700,666 | B2* | 3/2004 | Blouin | G01H 9/00 356/502 |
| 6,970,251 | B2* | 11/2005 | Vikhagen | G01B 11/2441 356/496 |
| 7,123,363 | B2* | 10/2006 | Puttappa | A61B 5/14532 356/450 |
| 7,126,586 | B2* | 10/2006 | Jianping | G01P 3/366 345/166 |
| 7,327,465 | B2* | 2/2008 | Hill | G03F 7/70516 356/498 |
| 7,812,950 | B2* | 10/2010 | Sharpe | G01S 17/58 356/337 |
| 8,868,379 | B2* | 10/2014 | Okada | G01B 9/02003 356/484 |
| 9,052,331 | B2* | 6/2015 | Tauro | G01P 3/68 |
| 2003/0037616 | A1 | 2/2003 | Vikhagen | |
| 2003/0043384 | A1* | 3/2003 | Hill | G03F 7/70775 356/510 |
| 2004/0114152 | A1* | 6/2004 | Hill | G03F 7/70716 356/498 |
| 2007/0064240 | A1* | 3/2007 | Hill | G01B 11/272 356/487 |
| 2007/0127035 | A1* | 6/2007 | Demarest | G01B 9/02007 356/498 |
| 2008/0304077 | A1* | 12/2008 | Demarest | G01B 9/02045 356/486 |
| 2013/0131475 | A1* | 5/2013 | Eisen | A61B 5/14552 600/324 |
| 2016/0153766 | A1* | 6/2016 | Jones | G01B 9/02098 356/511 |

FOREIGN PATENT DOCUMENTS

| | | |
|---|---|---|
| CN | 103308150 A | 9/2013 |
| CN | 103492843 A | 1/2014 |
| CN | 104457581 A | 3/2015 |

* cited by examiner

OVERALL Z-DIRECTION DISPLACEMENT MEASURING SYSTEM

CROSS-REFERENCE TO RELATED APPLICATION

This application is a continuation application of International Application No. PCT/CN2015/079452, filed on May 21, 2015, which claims priority to and benefits of Chinese Patent Application No. 201410430984.7, filed with the State Intellectual Property Office (SIPO) of the People's Republic of China on Aug. 28, 2014. The entire contents of the above referenced applications are hereby incorporated by reference.

TECHNICAL FIELD

The present invention relates to the technical field of full-field laser vibration measurement systems, and specifically relates to a full-field Z-direction displacement measurement system.

BACKGROUND

Most of the existing vibration measuring instruments can only carry out single-point measurement, e.g., contact mechanical vibration measuring instruments and non-contact laser Doppler vibrometers. Various industrialized countries have strong demands for full-field vibration measuring instruments. Some large international companies also attempt to develop such products, e.g., the scanning Doppler vibrometer of the German Polytec and the multipoint Doppler vibrometer of the United States MetroLaser. Although the vibration conditions of some key parts can be monitored by single-point vibration measurement, the vibration mode of a complex structure of an overall component cannot be reflected fully and correctly. It not only brings great difficulty for structural optimization, but also greatly limits the development speed of aerospacecrafts and new materials and the final performance. The former is only applicable to steady-state vibration and is ineffective to transient vibration that occurs in the majority of cases. The latter has few measurement points and is expensive. Apparently, the existing vibration measuring instruments cannot meet the requirements of the industry, and thus this problem needs to be solved urgently. Although laser shearing speckle interferometry has been widely used in deformation measurement and non-destructive testing in the industry, the existing laser shearing speckle interferometry is merely limited to static/semi-static measurement, and cannot be applied to transient vibration measurement. Furthermore, the method can be only used for measuring relative displacements, but cannot be used for measuring absolute displacements. Therefore, the existing vibration measuring instruments cannot achieve high-precision full-field absolute value vibration measurement and transient depth measurement.

SUMMARY

The object of the present invention is to provide a full-field Z-direction displacement measurement system, which can achieve dynamic measurement based on the traditional laser shearing speckle interferometry by using a spatial domain phase shift method, and further uses the homogeneity and similar measurement accuracy of the laser shearing speckle interferometry and the Doppler interferometry to help the laser shearing speckle interferometry to achieve absolute displacement measurement by using the single-point time domain Doppler interferometry. High-precision full-field absolute value vibration measurement and transient depth measurement can be finally achieved via the improvements in these aspects.

To achieve the object, the present invention adopts one technical solution:

A full-field Z-direction displacement measurement system includes a Doppler interference measurement module, a laser shearing speckle interference measurement module, a beam expansion and collimation module, a first detection module, a second detection module and a control module, wherein a measurement beam direction is a Z axis direction;

the Doppler interference measurement module is configured for measuring a single-point Z-direction absolute displacement of a measured target for the reference of the laser shearing speckle interference measurement module. The laser shearing speckle interference measurement module is configured for implementing dynamic measurement of a full-field relative displacement of the measured target. The beam expansion and collimation module is configured for generating laser speckles for a measurement beam of the Doppler interference measurement module and a measurement beam of the laser shearing speckle interference measurement module and collimating the measurement beams. The first detection module is configured for receiving interference information sent by the Doppler interference measurement module. The second detection module is configured for receiving the interference information sent by the laser shearing speckle interference measurement module. The control module is configured for controlling the laser shearing speckle interference measurement module to implement full-field dynamic measurement.

the Doppler interference measurement module includes a first laser, a first reflector, a first beam splitter, a second reflector, a frequency shifter, a third beam splitter and a second beam splitter. The measurement beam emitted by the first laser enters the first beam splitter after being reflected by the first reflector to form reference light and measurement light. The reference light enters the frequency shifter after being reflected by the second reflector, and a difference frequency is formed between the reference light and signal light by using the frequency shifter. The measurement light passes through the beam expansion and collimation module to form the laser speckles, impinges on the measured target after being collimated by the beam expansion and collimation module, generates difference frequency interference with the reference light penetrating the third beam splitter after being returned by the measured object and reflected by the second beam splitter, and enters the first detection module.

The laser shearing speckle interference measurement module includes a second laser, a first polarized beam splitter, a first ¼ wave plate, a second polarized beam splitter, a second ¼ wave plate, an adjustable tilting reflector, a third ¼ wave plate, a third reflector, a fourth beam splitter, a fourth reflector, a phase shifter and a polarizer. The measurement beam emitted by the second laser enters the beam expansion and collimation module after passing through the first polarized beam splitter and the first ¼ wave plate successively to form the laser speckles, impinges on the measured target after being collimated, is returned by the measured target, passes through the first ¼ wave plate again to rotate the polarization direction for 90° and enters the first polarized beam splitter. The measurement beam transmitted from the first polarized beam splitter enters the second polarized beam splitter, the measurement beam reflected by the second polarized beam splitter passes through the second ¼ wave plate and is reflected by the adjustable tilting reflector, then passes through the second ¼ wave plate again, enters the second polarized beam splitter and is transmitted. The measurement beam transmitted by the second polarized beam splitter passes through the third ¼ wave plate and is reflected by the third reflector, then passes through the third ¼ wave plate again, enters the second polarized beam splitter and is reflected. The beam transmitted by the second polarized beam splitter enters the fourth beam splitter after generating interference with the reflected beam. The transmitted beam from the fourth beam splitter enters the second detection module after passing through the phase shifter and the polarizer successively. The reflected beam from the fourth beam splitter passes through the polarizer after being reflected by the fourth reflector and enters the second detection module.

In one embodiment, the first detection module is a photodetector.

In one embodiment, the second detection module is a CMOS.

In one embodiment, the beam expansion and collimation module includes a diffractive optical element and a lens. Light from the Doppler interference measurement module impinges on the measured object after passing through the diffractive optical element and the lens successively. Light from the laser shearing speckle interference measurement module impinges on the measured object through the lens after being reflected by the diffractive optical element.

In one embodiment, the control module is configured for controlling the adjustable tilting reflector in the laser shearing speckle interference measurement module to implement full-field measurement.

In one embodiment, the full-field Z-direction displacement measurement system further includes a first interference signal demodulation module connected with the first detection module and a second interference signal demodulation module connected with the second detection module. The first interference signal demodulation module is configured for extracting the interference information detected by the first detection module. The second interference signal demodulation module is configured for extracting the interference information detected by the second detection module.

To achieve the object, the present invention adopts another technical solution:

A full-field Z-direction displacement measurement system includes a Doppler interference measurement module, a laser shearing speckle interference measurement module, a beam expansion and collimation module, a first detection module, a second detection module, a first interference signal demodulation module, a second interference signal demodulation module and a control module, wherein a measurement beam direction is a Z axis direction;

the Doppler interference measurement module is configured for measuring a single-point Z-direction absolute displacement of a measured target for the reference of the laser shearing speckle interference measurement module. The laser shearing speckle interference measurement module is configured for implementing dynamic measurement of a full-field relative displacement of the measured target. The beam expansion and collimation module is configured for generating laser speckles for a measurement beam of the Doppler interference measurement module and a measurement beam of the laser shearing speckle interference measurement module and collimating the measurement beams. The first detection module is configured for receiving interference information sent by the Doppler interference measurement module. The second detection module is configured for receiving the interference information sent by the laser shearing speckle interference measurement module. The control module is configured for controlling the laser shearing speckle interference measurement module to implement full-field dynamic measurement. The first interference signal demodulation module is configured for extracting the interference information detected by the first detection module, and the second interference signal demodulation module is configured for extracting the interference information detected by the second detection module.

The beam expansion and collimation module includes a diffractive optical element and a lens. Light from the Doppler interference measurement module impinges on the measured object after passing through the diffractive optical element and the lens successively. Light from the laser shearing speckle interference measurement module impinges on the measured object through the lens after being reflected by the diffractive optical element.

The Doppler interference measurement module includes a first laser, a first reflector, a first beam splitter, a second reflector, a frequency shifter, a third beam splitter and a second beam splitter. The measurement beam emitted by the first laser enters the first beam splitter after being reflected by the first reflector to form reference light and measurement light. The reference light enters the frequency shifter after being reflected by the second reflector, and a difference frequency is formed between the reference light and signal light by using the frequency shifter. The measurement light passes through the beam expansion and collimation module to form the laser speckles, impinges on the measured target after being collimated by the beam expansion and collimation module, generates difference frequency interference with the reference light penetrating the third beam splitter after being returned by the measured object and reflected by the second beam splitter, and enters the first detection module.

The laser shearing speckle interference measurement module includes a second laser, a first polarized beam splitter, a first ¼ wave plate, a second polarized beam splitter, a second ¼ wave plate, an adjustable tilting reflector, a third ¼ wave plate, a third reflector, a fourth beam splitter, a fourth reflector, a phase shifter and a polarizer. The measurement beam emitted by the second laser enters the beam expansion and collimation module after passing through the first polarized beam splitter and the first ¼ wave plate successively to form the laser speckles, impinges on the measured target after being collimated, is returned by the measured target, passes through the first ¼ wave plate again to rotate the polarization direction for 90° and enters the first polarized beam splitter. The measurement beam transmitted from the first polarized beam splitter enters the second polarized beam splitter; the measurement beam reflected by the second polarized beam splitter passes through the second ¼ wave plate and is reflected by the adjustable tilting reflector, then passes through the second ¼ wave plate again, enters the second polarized beam splitter and is transmitted. The measurement beam transmitted by the second polarized beam splitter passes through the third ¼ wave plate and is reflected by the third reflector, then passes through the third ¼ wave plate again, enters the second polarized beam splitter and is reflected. The beam transmitted by the second polarized beam splitter enters the fourth beam splitter after generating interference with the reflected beam, the transmitted beam from the fourth beam splitter enters the second detection module after passing through the phase shifter and the polarizer successively. The reflected beam from the fourth beam splitter passes through the polarizer after being reflected by the fourth reflector and enters the second detection module.

In one embodiment, the first detection module is a photodetector.

In one embodiment, the second detection module is a CMOS.

In one embodiment, the control module is configured for controlling the adjustable tilting reflector in the laser shearing speckle interference measurement module to implement full-field measurement.

To achieve the object, the present invention adopts yet another technical solution:

A full-field Z-direction displacement measurement system includes a Doppler interference measurement module, a laser shearing speckle interference measurement module, a beam expansion and collimation module, a first detection module, a second detection module and a control module, wherein a measurement beam direction is a Z axis direction.

The Doppler interference measurement module is configured for measuring a single-point Z-direction absolute displacement of a measured target for the reference of the laser shearing speckle interference measurement module. The laser shearing speckle interference measurement module is configured for implementing dynamic measurement of a full-field relative displacement of the measured target. The beam expansion and collimation module is configured for generating laser speckles for a measurement beam of the Doppler interference measurement module and a measurement beam of the laser shearing speckle interference measurement module and collimating the measurement beams. The first detection module is configured for receiving interference information sent by the Doppler interference measurement module. The second detection module is configured for receiving the interference information sent by the laser shearing speckle interference measurement module. The control module is configured for controlling the laser shearing speckle interference measurement module to implement full-field dynamic measurement.

The Doppler interference measurement module includes a first laser, a first reflector, a first beam splitter, a second reflector, a frequency shifter, a third beam splitter and a second beam splitter. The measurement beam emitted by the first laser enters the first beam splitter after being reflected by the first reflector to form reference light and measurement light. The reference light enters the frequency shifter after being reflected by the second reflector, and a difference frequency is formed between the reference light and signal light by using the frequency shifter. The measurement light passes through the beam expansion and collimation module to form the laser speckles, impinges on the measured target after being collimated by the beam expansion and collimation module, generates difference frequency interference with the reference light penetrating the third beam splitter after being returned by the measured object and reflected by the second beam splitter, and enters the first detection module.

The laser shearing speckle interference measurement module includes a second laser, a first polarized beam splitter, a first ¼ wave plate, a second polarized beam splitter, a second ¼ wave plate, an adjustable tilting reflector, a third ¼ wave plate, a third reflector, a fourth beam splitter, a fourth reflector, a phase shifter and a polarizer. The measurement beam emitted by the second laser enters the beam expansion and collimation module after passing through the first polarized beam splitter and the first ¼ wave plate successively to form the laser speckles, impinges on the measured target after being collimated, is returned by the measured target, passes through the first ¼ wave plate again to rotate the polarization direction for 90° and enters the first polarized beam splitter. The measurement beam transmitted from the first polarized beam splitter enters the second polarized beam splitter. The measurement beam reflected by the second polarized beam splitter passes through the second ¼ wave plate and is reflected by the adjustable tilting reflector, then passes through the second ¼ wave plate again, enters the second polarized beam splitter and is transmitted. The measurement beam transmitted by the second polarized beam splitter passes through the third ¼ wave plate and is reflected by the third reflector, then passes through the third ¼ wave plate again, enters the second polarized beam splitter and is reflected. The beam transmitted by the second polarized beam splitter enters the fourth beam splitter after generating interference with the reflected beam. The transmitted beam from the fourth beam splitter enters the second detection module after passing through the phase shifter and the polarizer successively. The reflected beam from the fourth beam splitter passes through the polarizer after being reflected by the fourth reflector and enters the second detection module.

In one embodiment, the first detection module is a photodetector.

In one embodiment, the second detection module is a CMOS.

In one embodiment, the beam expansion and collimation module includes a diffractive optical element and a lens. Light from the Doppler interference measurement module impinges on the measured object after passing through the diffractive optical element and the lens successively. Light from the laser shearing speckle interference measurement module impinges on the measured object through the lens after being reflected by the diffractive optical element.

In one embodiment, the control module is configured for controlling the adjustable tilting reflector in the laser shearing speckle interference measurement module to implement full-field measurement.

The full-field Z-direction displacement measurement system further includes a first interference signal demodulation module connected with the first detection module and a second interference signal demodulation module connected with the second detection module. The first interference signal demodulation module is configured for extracting the interference information detected by the first detection module. The second interference signal demodulation module is configured for extracting the interference information detected by the second detection module.

Beneficial Effects:

The full-field Z-direction displacement measurement system in the present invention includes the Doppler interference measurement module, the laser shearing speckle interference measurement module, the beam expansion and collimation module, the first detection module, the second detection module and the control module, wherein the measurement beam direction is the Z axis direction. The Doppler interference measurement module is configured for measuring the single-point Z-direction absolute displacement of the measured target for the reference of the laser shearing speckle interference measurement module. The laser shearing speckle interference measurement module is configured for implementing the dynamic measurement of the full-field relative displacement of the measured target. The beam expansion and collimation module is configured for generating the laser speckles for the measurement beam of the Doppler interference measurement module and the measurement beam of the laser shearing speckle interference measurement module and collimating the measurement beams. The first detection module is configured for receiving the interference information sent by the Doppler interference measurement module. The second detection module is configured for receiving the interference information sent by the laser shearing speckle interference measurement module. The control module is configured for controlling the laser shearing speckle interference measurement module to implement the full-field dynamic measurement. The laser shearing speckle interference measurement module combines a spatial domain phase shift method with the traditional laser shearing speckle interferometry, so that the dynamic measurement can be achieved on the basis of the traditional laser shearing speckle interferometry by using the spatial domain phase shift method. The homogeneity and similar measurement accuracy of the laser shearing speckle interferometry and the Doppler interferometry are further used to design a novel joint interference measurement device by integrating the Doppler interference measurement module with the laser shearing speckle interference measurement module. The laser shearing speckle interferometry is helped by the single-point time domain Doppler interferometry to achieve absolute displacement measurement. By means of the improvements in these aspects, the present invention can achieve high-precision full-field absolute value vibration measurement and transient depth measurement, solves the problem that the vibration measuring instruments in the prior art cannot carry out high-precision full-field absolute value vibration measurement on the measured object, has important applications in depth measurement, three-dimensional sensing, vibration measurement in aerospace and the depth measurement in new material characterization detection and other fields, and has very important applications in fields involving vibration optimization of complex structures such as the automotive development industry, the mechanical industry, the equipment manufacturing industry in China, etc.

REFERENCE SIGNS

1-Doppler interference measurement module; 2-laser shearing speckle interference measurement module; 3-beam expansion and collimation module; 4-first detection module; 5-second detection module; 6-control module; 11-first laser; 12-first reflector; 13-first beam splitter; 14-second reflector; 15-frequency shifter; 16-second beam splitter; 17-third beam splitter; 21-second laser; 22-first polarized beam splitter; 23-first ¼ wave plate; 24-second polarized beam splitter; 25-second ¼ wave plate; 26-adjustable tilting reflector; 27-third ¼ wave plate; 28-third reflector; 29-fourth beam splitter; 210-fourth reflector; 211-phase shifter; 212-polarizer; 31-diffractive optical element; 32-lens; 41-photodetector; 51-CMOS.

DETAILED DESCRIPTION

The technical solutions of the present invention will be further illustrated below by embodiments in combination with the accompany drawings.

Figure 1:
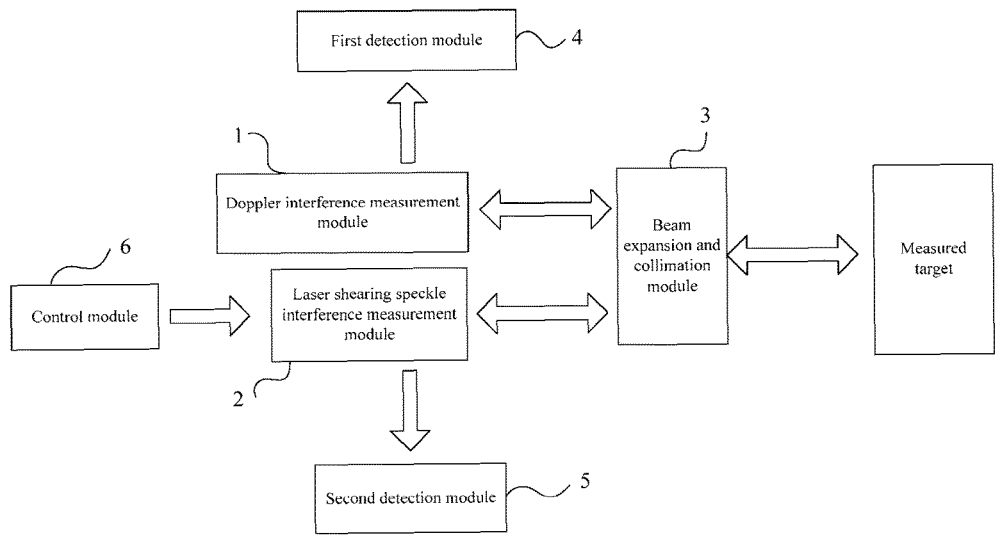
FIG. 1 is a structural schematic diagram of a full-field Z-direction displacement measurement system provided by an embodiment of the present invention.

FIG. 1 is a structural schematic diagram of a full-field Z-direction displacement measurement system provided by an embodiment of the present invention. As shown in FIG. 1, the full-field Z-direction displacement measurement system provided by the present invention includes: a Doppler interference measurement module 1, a laser shearing speckle interference measurement module 2, a beam expansion and collimation module 3, a first detection module 4, a second detection module 5, and a control module 6, wherein a measurement beam direction is a Z axis direction.

The Doppler interference measurement module 1 is configured for measuring a single-point Z-direction absolute displacement of a measured target for the reference of the laser shearing speckle interference measurement module 2. The laser shearing speckle interference measurement module 2 is configured for implementing dynamic measurement of a full-field relative displacement of the measured target. The beam expansion and collimation module 3 is configured for generating laser speckles for a measurement beam of the Doppler interference measurement module 1 and a measurement beam of the laser shearing speckle interference measurement module 2 and collimating the measurement beams. The first detection module 4 is configured for receiving interference information sent by the Doppler interference measurement module 1. The second detection module 5 is configured for receiving the interference information sent by the laser shearing speckle interference measurement module 2. The control module 6 is configured for controlling the laser shearing speckle interference measurement module 2 to implement full-field dynamic measurement.

According to the full-field Z-direction displacement measurement system provided by the present invention, the laser shearing speckle interference measurement module 2 combines a spatial domain phase shift method with the traditional laser shearing speckle interferometry, so that dynamic measurement can be achieved on the basis of the traditional laser shearing speckle interferometry by using the spatial domain phase shift method. The homogeneity and similar measurement accuracy of the laser shearing speckle interferometry and the Doppler interferometry are further used to design a novel joint interference measurement device by integrating the Doppler interference measurement module 1 with the laser shearing speckle interference measurement module 2. The laser shearing speckle interferometry is helped by the single-point time domain Doppler interferometry to achieve absolute displacement measurement. By means of the improvements in these aspects, the present invention can achieve high-precision full-field absolute value vibration measurement and transient depth measurement, solves the problem that the vibration measuring instruments in the prior art cannot carry out high-precision full-field absolute value vibration measurement on the measured object, has important applications in depth measurement, three-dimensional sensing, vibration measurement in aerospace and the depth measurement in new material characterization detection and other fields, and has very important applications in fields involving vibration optimization of complex structures such as the automotive development industry, the mechanical industry, the equipment manufacturing industry in China, etc.

Figure 2:
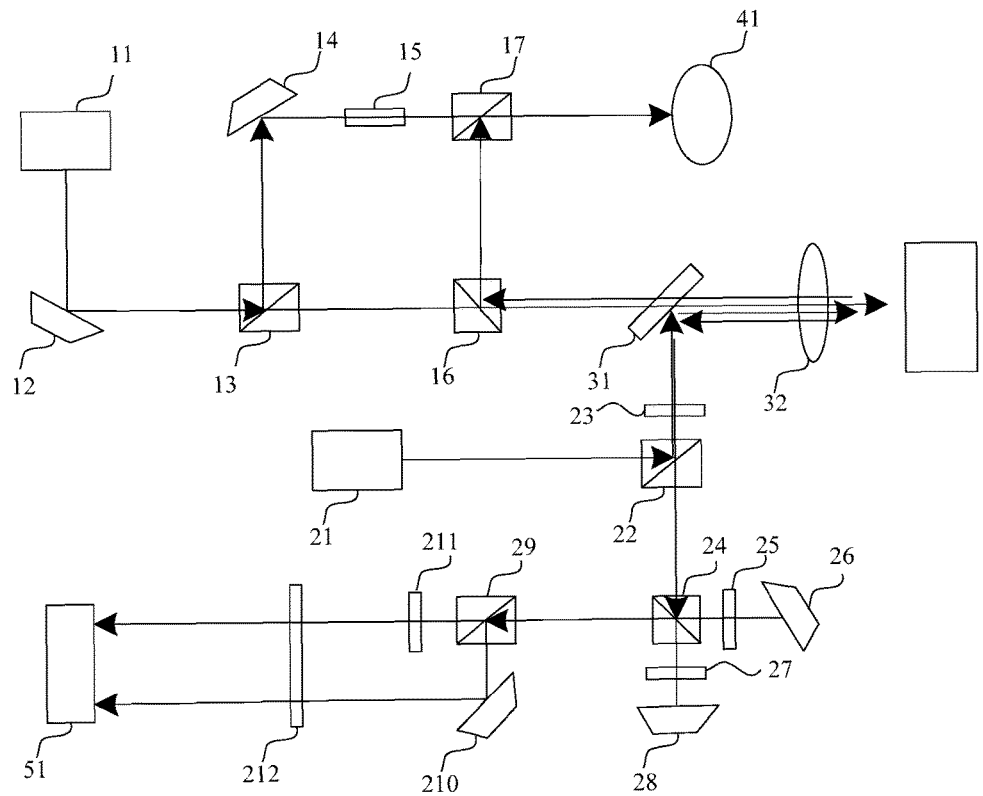
FIG. 2 is an optical path diagram of a full-field Z-direction displacement measurement system provided by an embodiment of the present invention.

As shown in FIG. 2, the Doppler interference measurement module 1 includes a first laser 11, a first reflector 12, a first beam splitter 13, a second reflector 14, a frequency shifter 15, a third beam splitter 17 and a second beam splitter 16. The measurement beam emitted by the first laser 11 enters the first beam splitter 13 after being reflected by the first reflector 12 to form reference light and measurement light. The reference light enters the frequency shifter 15 after being reflected by the second reflector 14, and a difference frequency is formed between the reference light and signal light by using the frequency shifter 15. The measurement light passes through the beam expansion and collimation module to form the laser speckles 3, impinges on the measured target after being collimated by the beam expansion and collimation module, generates difference frequency interference with the reference light penetrating the third beam splitter 17 after being returned by the measured object and reflected by the second beam splitter 16, and enters the first detection module 4.

As shown in FIG. 2, the laser shearing speckle interference measurement module 2 includes a second laser 21, a first polarized beam splitter 22, a first ¼ wave plate 23, a second polarized beam splitter 24, a second ¼ wave plate 25, an adjustable tilting reflector 26, a third ¼ wave plate 27, a third reflector 28, a fourth beam splitter 29, a fourth reflector 210, a phase shifter 211 and a polarizer 212. The measurement beam emitted by the second laser 21 enters the beam expansion and collimation module 3 after passing through the first polarized beam splitter 22 and the first ¼ wave plate 23 successively to form the laser speckles, impinges on the measured target after being collimated, is returned by the measured target, passes through the first ¼ wave plate 23 again to rotate the polarization direction for 90° and enters the first polarized beam splitter 22. The measurement beam transmitted from the first polarized beam splitter 22 enters the second polarized beam splitter 24. The measurement beam reflected by the second polarized beam splitter 24 passes through the second ¼ wave plate 25 and is reflected by the adjustable tilting reflector 26, then passes through the second ¼ wave plate 25 again, enters the second polarized beam splitter 24 and is transmitted. The measurement beam transmitted by the second polarized beam splitter 24 passes through the third ¼ wave plate 27 and is reflected by the third reflector 28, then passes through the third ¼ wave plate 27 again, enters the second polarized beam splitter 24 and is reflected. The beam transmitted by the second polarized beam splitter 24 enters the fourth beam splitter 29 after generating interference with the reflected beam. The transmitted beam from the fourth beam splitter 29 enters the second detection module 5 after passing through the phase shifter 211 and the polarizer 212 successively. The reflected beam from the fourth beam splitter 29 passes through the polarizer 212 after being reflected by the fourth reflector 210 and enters the second detection module 5.

Preferably, the first detection module 4 is a photodetector 41.

Preferably, the second detection module 5 is a CMOS 51.

As shown in FIG. 2, the beam expansion and collimation module 3 includes a diffractive optical element 31 and a lens 32. Light from the Doppler interference measurement module 1 impinges on the measured object after passing through the diffractive optical element 31 and the lens 32 successively. Light from the laser shearing speckle interference measurement module 2 impinges on the measured object through the lens 32 after being reflected by the diffractive optical element 31.

The control module 6 is configured for controlling the adjustable tilting reflector 26 in the laser shearing speckle interference measurement module 2 to implement full-field measurement.

The full-field Z-direction displacement measurement system further includes a first interference signal demodulation module connected with the first detection module 4 and a second interference signal demodulation module connected with the second detection module 5. The first interference signal demodulation module is configured for extracting the interference information detected by the first detection module 4. The second interference signal demodulation module is configured for extracting the interference information detected by the second detection module 5.

Described above are merely preferred embodiments of the present invention, but the protection scope of the present invention is not limited thereto, equivalent substitutions or modifications made by any person skilled in the art within the technical scope disclosed by the present invention according to the technical solutions of the present invention and the inventive concepts thereof shall all fall within the protection scope of the present invention.

What is claimed is:

1. A full-field Z-direction displacement measurement system, comprising:
a Doppler interference measurement module;
a laser shearing speckle interference measurement module;
a beam expansion and collimation module;
a first detection module;
a second detection module; and
wherein a measurement beam direction is a Z axis direction;
wherein the Doppler interference measurement module is configured for measuring a single-point Z-direction absolute displacement of a measured target for the reference of the laser shearing speckle interference measurement module; the laser shearing speckle interference measurement module is configured for implementing dynamic measurement of a full-field relative displacement of the measured target; the beam expansion and collimation module is configured for generating laser speckles for a measurement beam of the Doppler interference measurement module and a measurement beam of the laser shearing speckle interference measurement module and collimating the measurement beams; the first detection module is configured for receiving interference information sent by the Doppler interference measurement module; the second detection module is configured for receiving the interference information sent by the laser shearing speckle interference measurement module;
wherein the Doppler interference measurement module comprises a first laser, a first reflector, a first beam splitter, a second reflector, a frequency shifter, a third beam splitter and a second beam splitter; the measurement beam emitted by the first laser enters the first beam splitter after being reflected by the first reflector to form reference light and measurement light; the reference light enters the frequency shifter after being reflected by the second reflector, and a difference frequency is formed between the reference light and a signal light by using the frequency shifter; and the measurement light passes through the beam expansion and collimation module to form the laser speckles, impinges on the measured target after being collimated by the beam expansion and collimation module, generates difference frequency interference with the reference light penetrating the third beam splitter after being returned by the measured object and reflected by the second beam splitter, and enters the first detection module; and wherein the laser shearing speckle interference measurement module comprises a second laser, a first polarized beam splitter, a first ¼ wave plate, a second polarized beam splitter, a second ¼ wave plate, an adjustable tilting reflector, a third ¼ wave plate, a third reflector, a fourth beam splitter, a fourth reflector, a phase shifter and a polarizer; the measurement beam emitted by the second laser enters the beam expansion and collimation module after passing through the first polarized beam splitter and the first ¼ wave plate successively to form the laser speckles, impinges on the measured target after being collimated, is returned by the measured target, passes through the first ¼ wave plate again to rotate the polarization direction for 90° and enters the first polarized beam splitter; the measurement beam transmitted from the first polarized beam splitter enters the second polarized beam splitter; the measurement beam reflected by the second polarized beam splitter passes through the second ¼ wave plate and is reflected by the adjustable tilting reflector, then passes through the second ¼ wave plate again, enters the second polarized beam splitter and is transmitted; the measurement beam transmitted by the second polarized beam splitter passes through the third ¼ wave plate and is reflected by the third reflector, then passes through the third ¼ wave plate again, enters the second polarized beam splitter and is reflected; the beam transmitted by the second polarized beam splitter enters the fourth beam splitter after generating interference with the reflected beam; the transmitted beam from the fourth beam splitter enters the second detection module after passing through the phase shifter and the polarizer successively; and the reflected beam from the fourth beam splitter passes through the polarizer after being reflected by the fourth reflector and enters the second detection module.

2. The full-field Z-direction displacement measurement system of claim 1, wherein the first detection module is a photodetector.

3. The full-field Z-direction displacement measurement system of claim 1, wherein the second detection module is a CMOS.

4. The full-field Z-direction displacement measurement system of claim 1, wherein the beam expansion and collimation module comprises a diffractive optical element and a lens; wherein light from the Doppler interference measurement module impinges on the measured object after passing through the diffractive optical element and the lens successively; and wherein light from the laser shearing speckle interference measurement module impinges on the measured object through the lens after being reflected by the diffractive optical element.

5. The full-field Z-direction displacement measurement system of claim 1, further comprising:

a first interference signal demodulation module connected with the first detection module; and a second interference signal demodulation module connected with the second detection module, wherein the first interference signal demodulation module is configured for extracting the interference information detected by the first detection module, and the second interference signal demodulation module is configured for extracting the interference information detected by the second detection module.

6. A full-field Z-direction displacement measurement system, comprising:

a Doppler interference measurement module;

a laser shearing speckle interference measurement module;

a beam expansion and collimation module;

a first detection module;

a second detection module;

a first interference signal demodulation module;

a second interference signal demodulation module; and wherein a measurement beam direction is a Z axis direction;

wherein the Doppler interference measurement module is configured for measuring a single-point Z-direction absolute displacement of a measured target for the reference of the laser shearing speckle interference measurement module; the laser shearing speckle interference measurement module is configured for implementing dynamic measurement of a full-field relative displacement of the measured target; the beam expansion and collimation module is configured for generating laser speckles for a measurement beam of the Doppler interference measurement module and a measurement beam of the laser shearing speckle interference measurement module and collimating the measurement beams; the first detection module is configured for receiving interference information sent by the Doppler interference measurement module; the second detection module is configured for receiving the interference information sent by the laser shearing speckle interference measurement module; the first interference signal demodulation module is configured for extracting the interference information detected by the first detection module, and the second interference signal demodulation module is configured for extracting the interference information detected by the second detection module; and wherein the beam expansion and collimation module comprises a diffractive optical element and a lens; light from the Doppler interference measurement module impinges on the measured object after passing through the diffractive optical element and the lens successively; and light from the laser shearing speckle interference measurement module impinges on the measured object through the lens after being reflected by the diffractive optical element.

7. The full-field Z-direction displacement measurement system of claim 6, wherein the Doppler interference measurement module comprises a first laser, a first reflector, a first beam splitter, a second reflector, a frequency shifter, a third beam splitter and a second beam splitter; the measurement beam emitted by the first laser enters the first beam splitter after being reflected by the first reflector to form reference light and measurement light; the reference light enters the frequency shifter after being reflected by the second reflector, and a difference frequency is formed between the reference light and a signal light by using the frequency shifter; and the measurement light passes through the beam expansion and collimation module to form the laser speckles, impinges on the measured target after being collimated by the beam expansion and collimation module, generates difference frequency interference with the reference light penetrating the third beam splitter after being returned by the measured object and reflected by the second beam splitter, and enters the first detection module.

8. The full-field Z-direction displacement measurement system of claim 6, wherein the laser shearing speckle interference measurement module comprises a second laser, a first polarized beam splitter, a first ¼ wave plate, a second polarized beam splitter, a second ¼ wave plate, an adjustable tilting reflector, a third ¼ wave plate, a third reflector, a fourth beam splitter, a fourth reflector, a phase shifter and a polarizer; the measurement beam emitted by the second laser enters the beam expansion and collimation module after passing through the first polarized beam splitter and the first ¼ wave plate successively to form the laser speckles, impinges on the measured target after being collimated, is returned by the measured target, passes through the first ¼ wave plate again to rotate the polarization direction for 90° and enters the first polarized beam splitter; the measurement beam transmitted from the first polarized beam splitter enters the second polarized beam splitter; the measurement beam reflected by the second polarized beam splitter passes through the second ¼ wave plate and is reflected by the adjustable tilting reflector, then passes through the second ¼ wave plate again, enters the second polarized beam splitter and is transmitted; the measurement beam transmitted by the second polarized beam splitter passes through the third ¼ wave plate and is reflected by the third reflector, then passes through the third ¼ wave plate again, enters the second polarized beam splitter and is reflected; the beam transmitted by the second polarized beam splitter enters the fourth beam splitter after generating interference with the reflected beam; the transmitted beam from the fourth beam splitter enters the second detection module after passing through the phase shifter and the polarizer successively; and the reflected beam from the fourth beam splitter passes through the polarizer after being reflected by the fourth reflector and enters the second detection module.

9. The full-field Z-direction displacement measurement system of claim 6, wherein the first detection module is a photodetector.

10. The full-field Z-direction displacement measurement system of claim 6, wherein the second detection module is a CMOS.

11. A full-field Z-direction displacement measurement system, comprising:
a Doppler interference measurement module;
a laser shearing speckle interference measurement module;
a beam expansion and collimation module;
a first detection module;
a second detection module; and
wherein a measurement beam direction is a Z axis direction; and
wherein the Doppler interference measurement module is configured for measuring a single-point Z-direction absolute displacement of a measured target for the reference of the laser shearing speckle interference measurement module; the laser shearing speckle interference measurement module is configured for implementing dynamic measurement of a full-field relative displacement of the measured target; the beam expansion and collimation module is configured for generating laser speckles for a measurement beam of the Doppler interference measurement module and a measurement beam of the laser shearing speckle interference measurement module and collimating the measurement beams; the first detection module is configured for receiving interference information sent by the Doppler interference measurement module; the second detection module is configured for receiving the interference information sent by the laser shearing speckle interference measurement module;
wherein the laser shearing speckle interference measurement module comprises a second laser, a first polarized beam splitter, a first ¼ wave plate, a second polarized beam splitter, a second ¼ wave plate, an adjustable tilting reflector, a third ¼ wave plate, a third reflector, a fourth beam splitter, a fourth reflector, a phase shifter and a polarizer; the measurement beam emitted by the second laser enters the beam expansion and collimation module after passing through the first polarized beam splitter and the first ¼ wave plate successively to form the laser speckles, impinges on the measured target after being collimated, is returned by the measured target, passes through the first ¼ wave plate again to rotate the polarization direction for 90° and enters the first polarized beam splitter; the measurement beam transmitted from the first polarized beam splitter enters the second polarized beam splitter; the measurement beam reflected by the second polarized beam splitter passes through the second ¼ wave plate and is reflected by the adjustable tilting reflector, then passes through the second ¼ wave plate again, enters the second polarized beam splitter and is transmitted; the measurement beam transmitted by the second polarized beam splitter passes through the third ¼ wave plate and is reflected by the third reflector, then passes through the third ¼ wave plate again, enters the second polarized beam splitter and is reflected; the beam transmitted by the second polarized beam splitter enters the fourth beam splitter after generating interference with the reflected beam; the transmitted beam from the fourth beam splitter enters the second detection module after passing through the phase shifter and the polarizer successively; and the reflected beam from the fourth beam splitter passes through the polarizer after being reflected by the fourth reflector and enters the second detection module.

12. The full-field Z-direction displacement measurement system of claim 11, wherein the Doppler interference measurement module comprises a first laser, a first reflector, a first beam splitter, a second reflector, a frequency shifter, a third beam splitter and a second beam splitter; wherein the measurement beam emitted by the first laser enters the first beam splitter after being reflected by the first reflector to form reference light and measurement light; the reference light enters the frequency shifter after being reflected by the second reflector, and a difference frequency is formed between the reference light and a signal light by using the frequency shifter; and the measurement light passes through the beam expansion and collimation module to form the laser speckles, impinges on the measured target after being collimated by the beam expansion and collimation module, generates difference frequency interference with the reference light penetrating the third beam splitter after being returned by the measured object and reflected by the second beam splitter, and enters the first detection module.

13. The full-field Z-direction displacement measurement system of claim 11, wherein the first detection module is a photodetector.

14. The full-field Z-direction displacement measurement system of claim 11, wherein the second detection module is a CMOS.

15. The full-field Z-direction displacement measurement system of claim 11, wherein the beam expansion and collimation module comprises a diffractive optical element and a lens; and wherein light from the Doppler interference measurement module impinges on the measured object after passing through the diffractive optical element and the lens successively, and light from the laser shearing speckle interference measurement module impinges on the measured object through the lens after being reflected by the diffractive optical element.

16. The full-field Z-direction displacement measurement system of claim 11, further comprising:
a first interference signal demodulation module connected with the first detection module; and
a second interference signal demodulation module connected with the second detection module,
wherein the first interference signal demodulation module is configured for extracting the interference information detected by the first detection module, and the second interference signal demodulation module is configured for extracting the interference information detected by the second detection module.

* * * * *